(12) United States Patent
Su et al.

(10) Patent No.: US 10,724,957 B2
(45) Date of Patent: Jul. 28, 2020

(54) MICRO-DROPLET FLUORESCENCE DETECTION SYSTEM

(71) Applicant: TARGETINGONE CORPORATION, Beijing (CN)

(72) Inventors: Shisheng Su, Beijing (CN); Yong Guo, Beijing (CN); Gaoshan Jing, Beijing (CN); Bo Wang, Beijing (CN); Miaoqi Zhang, Beijing (CN); Zhe Liu, Beijing (CN); Huafang Gao, Beijing (CN); Lingxiang Zhu, Beijing (CN); Wenjun Yang, Beijing (CN); Yongdou Wang, Beijing (CN)

(73) Assignee: TARGETINGONE CORPORATION, Beijing (CN)

( * ) Notice: Subject to any disclaimer, the term of this patent is extended or adjusted under 35 U.S.C. 154(b) by 0 days.

(21) Appl. No.: 16/328,990

(22) PCT Filed: Sep. 6, 2017

(86) PCT No.: PCT/CN2017/100658
§ 371 (c)(1),
(2) Date: Feb. 27, 2019

(87) PCT Pub. No.: WO2018/045953
PCT Pub. Date: Mar. 15, 2018

(65) Prior Publication Data
US 2019/0212264 A1    Jul. 11, 2019

(30) Foreign Application Priority Data

Sep. 12, 2016   (CN) .......................... 2016 1 0818495

(51) Int. Cl.
*G01N 21/64*    (2006.01)

(52) U.S. Cl.
CPC ........... *G01N 21/645* (2013.01); *G01N 21/64* (2013.01); *G01N 2021/6482* (2013.01); *G01N 2201/061* (2013.01)

(58) Field of Classification Search
CPC ................. G01N 21/645; G01N 21/64; G01N 2021/6482
See application file for complete search history.

(56) References Cited

U.S. PATENT DOCUMENTS

| 6,207,031 B1 * | 3/2001 | Adourian .............. B01L 3/0275 204/450 |
| 2005/0264805 A1 * | 12/2005 | Cromwell ............ G01N 21/253 356/246 |

(Continued)

FOREIGN PATENT DOCUMENTS

| CN | 101620187 A | 1/2010 |
| CN | 102879366 A | 1/2013 |

(Continued)

OTHER PUBLICATIONS

International Search Report dated Nov. 30, 2017 issued in PCT/CN2017/100658.

(Continued)

*Primary Examiner* — Hugh Maupin
(74) *Attorney, Agent, or Firm* — Scully Scott Murphy & Presser

(57) ABSTRACT

A micro-droplet fluorescence detection system, comprising a microfluidic chip (1), an optical path device, and a movement control device for controlling the chip (1) and an optical path device to move, so that the chip (1) moves relative to the optical path device during a fluorescence scanning detection process of micro-droplets in the chip (1), and the micro-droplets inside the chip (1) remains stationary relative to the chip (1). The micro-droplet fluorescence detection system has advantages of avoiding cross contami- (Continued)

nation due to closed detection, high detection rate, high throughput and high sensitivity.

10 Claims, 3 Drawing Sheets

(56) References Cited

U.S. PATENT DOCUMENTS

2015/0232942 A1* 8/2015 Abate ................. C12Q 1/6886
  506/9
2016/0129443 A1* 5/2016 Tovar ................. G01N 15/1484
  506/27

FOREIGN PATENT DOCUMENTS

| CN | 105300943 | A  | 2/2016  |
|----|-----------|----|---------|
| CN | 106442443 | A  | 2/2017  |
| EP | 2239557   | A1 | 10/2010 |
| TW | 266053    | B  | 11/2006 |

OTHER PUBLICATIONS

Chinese Office Action dated Jul. 4, 2018 issued in CN 20160818495.8.

English-Language Translation of the Written Opinion of the International Searching Authority dated Nov. 30, 2017 received in International Application No. PCT/CN2017/100658.

International Preliminary Report on Patentability dated Mar. 12, 2019 received in International Application No. PCT/CN2017/100658.

* cited by examiner

MICRO-DROPLET FLUORESCENCE DETECTION SYSTEM

TECHNICAL FIELD

This invention relates to the field of micro-droplets, and in particular to a micro-droplet fluorescence detection system.

BACKGROUND

The microfluidic technology is a biochemical analysis technology that has been developed rapidly in recent years. It has potential advantages such as high throughput, high detection sensitivity, low cost and easy automation, making it have a wide application prospect in the field of biochemical detection, especially in the field of biomedicine.

Droplet microfluidic technology is an important component of microfluidic technology. The micro-droplet microfluidic technology is to transfer two mutually incompatible fluids, taking the most common water and oil as an example, into the micron-scale channel, so that the water phase is divided into small micro-droplets of stable size, on the order of micrometers by the oil phase through the action of fluid mechanics Each micro-droplet acting as an independent reactor, is equivalent to the tube commonly used in biochemical reactions. The "small tube" of micro-droplets is small in size and large in number, and has many advantages such as high throughput, low reagent consumption and low background noise, so it has a good industrialization prospect.

The high throughput of micro-droplet technology benefits from the large number of micro-droplets and small volume, but it also has a challenge for detecting micro-droplet fluorescence signals. If the number of micro-droplets is large, the detection rate of the micro-droplet fluorescence is required to be high, otherwise high throughput cannot be achieved. The small volume of the micro-droplets has a challenge to the intensive reading of the detection system. At present, the micro-droplet fluorescence detection methods used in papers and commercial instruments mainly include the following three methods.

The first method is to separate the micro-droplets by the sheath flow and sequentially pass through the detection zone containing the excitation light and the detection light path, and then systematically record the fluorescence intensity of each micro-droplet. This detection method is similar to flow cytometry, which is characterized in that an optical path system is fixed and a sample passes through the detection zone in turn. This type of detection is widely used not only in academia, but also in existing micro-droplet commercial instruments, including Bio-Rad's QX200 and RainDrop Digital PCR System from Raindance Technologies in the USA. This detection method has the advantages of high precision, high sensitivity and good stability of micro-droplet fluorescence detection. The disadvantage is that there is a bottleneck in the micro-droplet detection rate, since the micro-droplet flow velocity is limited by its stability. Raindance's RainDrop Digital PCR System takes about half an hour to read the fluorescence of about 5 million micro-droplets, and detects about 3,000 micro-droplets per second. Such detection rate can not meet the detection requirements of clinical high-throughput detection.

The second method is to use fluorescence imaging to capture a certain number of micro-droplet fluorescence images at a time, and then use image processing technology to automatically identify the micro-droplet fluorescence in the image to obtain the fluorescence information of the micro-droplets. Due to the large imaging range, this detection method does not require sample flow during detection and requires less fluid driving system; and it can detect not only micro-droplets in microchannels, but also on chip cavities and even slides. The requirement on the detection environment where the microdroplets are located is low. The defect is that imaging picture is required for image processing, and image processing is not only complicated, but also computationally intensive, requiring high hardware and software support; in addition, because of the need to use a camera to acquire images, the resolution capability for the intensity of the fluorescence signal is lower than that of the photoelectric multiplier tube, so that the detection of the fluorescence of the droplets is also influenced.

The third method of detecting droplets is to place the droplets in a cylindrical transparent container. The container rotates at a high speed with the central axis of the cylinder as a rotary shaft. Due to the centrifugal force, droplets will be distributed inside the container wall, and the fluorescence is excited. The focus of an optical path coincides with the focus of a fluorescent receiving optical path and is located inside the container wall, then the container rotates by a circle, the fluorescent detection light path can obtain the fluorescence information of the droplets on the "circular ring" corresponding to the position where the focal point is located, the height of the container is changed, and the fluorescent information of droplets on the other "circular ring" can be obtained, the fluorescent signals of all droplets are obtained through the method. This type of detection is in a non-flowing state because the micro-droplets are relatively stationary relative to the container during the detection process, so that there is no micro-droplet stability which affects high-speed movement, achieving a high detection rate, which can be detected approximately 100,000 micro-droplets per second. However, the shortcoming is that the microfluidic technology is not used, the whole detection environment is in an open state, which is easy to pollute the biochemical detection environment and affect subsequent detection. At the same time, the excitation position of each micro-droplet fluorescence is not uniform, and the fluorescent signals cannot be quantified and compared, and the obtained data quality is influenced.

SUMMARY

The object of the present invention is to overcome the deficiencies of several micro-droplet fluorescence detection methods described above, and to provide a novel micro-droplet fluorescence detection system.

In one embodiment, the micro-droplet fluorescence detection system comprises: a microfluidic chip comprising a channel for storing micro-droplets such that the micro-droplets are laid in a single layer in the channel; an optical path device comprising fluorescent excitation part, a fluorescence collecting part, a bright field imaging part, and a micro-droplet position detecting part; the fluorescent excitation part causes the micro-droplets containing the fluorescent substance to be fluorescent in an excitation zone; and the fluorescence collecting part is used for separating the micro-droplet fluorescence spectral signal from background light and the micro-droplet fluorescence spectral signal is detected by a detecting device; the bright field imaging part utilizes an illumination source and an imaging optical path to acquire the image information of the chip channel in real time, thereby realizing the alignment of a detection zone and a chip channel; the micro-droplet position detecting part utilizes an oil phase and a water phase of the micro-droplets to be different in light refractive index for realizing determination of the micro-droplet position of the detection zone; a movement control device, which is used for controlling the mechanical movement of the chip and the optical path device, so that in the process of the micro-droplet fluorescence scanning detection in the chip, the chip and the optical path device move relative to each other, while the micro-droplets in the chip and the chip are kept relatively static.

In one embodiment, said channel depth ranges from 5 μm to 1 mm and said channel width ranges from 5 μm to 10 cm.

In one embodiment, said chip has a circular shape, the channel is formed by connecting a plurality of arcs, and the center of each arc coincides with the center of the chip; or the chip has a rectangular shape, and the channel is composed of one or more cavities.

In one embodiment, the excitation light wavelength range used by the fluorescence excitation part ranges from 200 nm to 3000 nm.

In one embodiment, the excitation zone comprises a plurality of micro-droplets, and the excitation light simultaneously excites a plurality of micro-droplets in the excitation zone. For example, the LED can be used as an excitation light source, and the light of the required wave band is separated out by a light filtering device to serve as an excitation light, and using an optical lens set, the excitation light is converted into a parallel or converged light beam, and the light beam is irradiated onto a region of the chip containing a plurality of micro-droplets to form an excitation zone; or the excitation zone contains at most one micro-droplet, the excitation light simultaneously excites at most one micro-droplet in the excitation zone. For example, a laser beam of a specific wavelength can be concentrated into the detection zone by using a microscope objective or an optical fiber to form an excitation zone corresponding to the size of the detection zone, due to the fact that at most one micro-droplet is contained in the detection zone, thus the excitation zone also contains at most one micro-droplet.

In one embodiment, the fluorescent excitation part is integral with or separate from the fluorescence collecting part.

In one embodiment, in the micro-droplet fluorescence detection process, the movement control device enables the chip to rotate along a rotation center, and the optical path device moves radially along the rotation center of the chip to complete the fluorescence detection process; or in the micro-droplet fluorescence detection process, the movement control device causes the optical path device to be stationary, and the chip is used for completing the fluorescence detection process in a line-by-line scanning movement mode; or in the micro-droplet fluorescence detection process, the movement control device is used for enabling the chip to be static. The optical path device completes the fluorescence detection process by taking the center of the chip as a starting point according to a spiral movement track.

In one embodiment, the movement control device comprises an electric rotating table, an electric lifting table and a control system, the electric rotating table is fixed on the electric lifting table; the control system controls the movement of the electric rotating table and the electric lifting table; the microfluidic chip is fixed on the electric rotating table through a rotary shaft, and the center of the microfluidic chip coincides with the rotating center of the rotary shaft.

In one embodiment, the movement control device further includes an electric sliding table, the optical path device is fixed on the electric sliding table, the electric sliding table is controlled by the control system and can horizontally move in the direction toward to or away from the rotating center.

In one embodiment, the light beam emitted or received by the optical path device corresponds to the microfluidic chip detection zone; the optical path device includes a micro-droplet detecting sensor located above the detection zone.

The micro-droplet fluorescence detecting system of the present invention has the following beneficial effects:

1. The micro-droplet fluorescence detection has a high rate and high throughput. Since the invention adopts a method in which micro-droplets do not flow is not affected by the stability of the micro-droplets, the micro-droplets can move relative to the fluorescence detecting system at a rapid speed, thereby realizing rapid micro-droplet detection and more than 50,000 micro-droplets can be detected every second, which is 10 times that of the currently-used micro-droplets fluorescence detection method.

2. Fluorescence detection has high sensitivity and high data quality. Since the effective area of the fluorescence detection of the present invention is small, the noise of the background is well reduced, and the signal-to-noise ratio of the signal is improved, thereby achieving high sensitivity. At the same time, the detection zone is aligned with the center of each micro-droplet so that the fluorescence excitation state of each micro-droplet is uniform, thereby ensuring high data quality.

3. Closed detection to avoid cross contamination. The invention provides a full-closed microfluidic chip for carrying out fluorescence detection, so that the cross contamination between different samples is well avoided, and the reliability of the detection result is also improved, and the method is especially suitable for the field of biomedicine.

BRIEF DESCRIPTION OF THE DRAWINGS

In order to clearly illustrate the technical solutions in the embodiments of the present application, the accompanying drawings required to be used in the embodiments are introduced briefly in the following, and apparently, the present invention will be described in detail below with reference to the accompanying drawings, in which: the accompanying drawings in the following description are only some embodiments described in the present application. Those skilled in the art can also obtain other drawings based on these drawings without any creative work.

DETAILED DESCRIPTION OF THE INVENTION

In order to make those skilled in the art better understand the technical solutions in the present application, the present invention will be further described in conjunction with the following embodiments. Apparently, the described embodiments are merely a part of the embodiments of the present application rather than all embodiments. All other embodiments obtained by a person of ordinary skill in the art based on the embodiments of the present application without departing from the inventive scope should fall within the scope of the present application.

Example 1

Micro-Droplet Fluorescence Detection System of the Present Application

Figure 1:
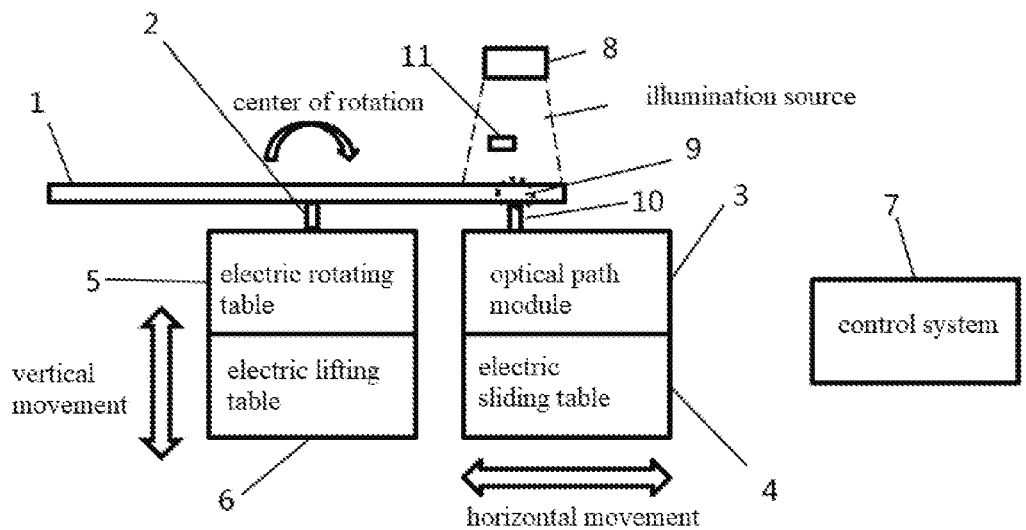
FIG. 1 is a schematic structural diagram of a micro-droplet fluorescence detection system according to an embodiment of the present invention.

In one embodiment, the system components of the present invention are as shown in FIG. 1. The system can be divided into three parts according to functions: a microfluidic chip, an optical path device, and a movement control device.

A microfluidic chip comprises a channel for storing micro-droplets that are laid in a single layer in the channel. The microfluidic chip is the microfluidic chip 1 in the system shown in FIG. 1.

An optical path device includes a fluorescence excitation part, a fluorescence collecting part, a bright field imaging part, and a micro-droplet position detecting part. The fluorescent excitation part forms a specific excitation light by using an excitation light source, and is irradiated into the excitation zone, so that the micro-droplets containing the fluorescent substance in the excitation zone generate fluorescence; the fluorescence collecting part is used for collecting the fluorescence of the micro-droplets in the detection zone through the light collecting device. The micro-droplet fluorescence is separated from the background light and detected by a detecting device; the bright field imaging part uses the illumination source and the imaging light path to collect the image of the chip channel through the camera, and under the cooperation of the movement control device, the alignment between the detection zone and the chip channel is completed. The above work is done prior to the micro-droplet fluorescence detection. The micro-droplet position detecting part utilizes the principle that an oil phase and a water phase have different light refractive indexes, and the beam will have different angles when the micro-droplet passes; and realizes the determination of the position of the micro-droplet in the detection zone according to the information collected by the beam sensor at different positions to calculate the refraction condition of the light beams. The optical path device includes an optical path module 3, an illumination source 8, a detection zone 9, a light beam 10, and a micro-droplet detection sensor 11 in the system shown in FIG. 1.

The movement control device controls the movement of the chip and the optical path device such that during the micro-droplet fluorescence scanning detection in the chip, the chip and the optical path device generate relative movement, and the micro-droplets in the chip and the chip are kept relatively static. The movement control device includes a rotary shaft 2, an electric sliding table 4, an electric rotating table 5, an electric lifting table 6, and a control system 7 in the system shown in FIG. 1. The microfluidic chip 1 is fixed to the electric rotating table 5 via the rotary shaft 2, and the center of the microfluidic chip 1 coincides with the center of rotation of the rotary shaft 2. The electric rotating table 5 can control the rotary shaft 2 to rotate at a rotational speed of 0 to 6000 rpm, which is controlled by the control system 7. The electric rotating table 5 is fixed to the electric lifting table 6, and the electric lifting table 6 can vertically raise or lower modules fixed thereto, and its movement accuracy is 1 micrometer, and is controlled by the control system 7. The optical path module 3 is fixed to the electric sliding table 4, and the electric sliding table 4 is horizontally movable toward or away from the center of rotation with an accuracy of 5 μm and controlled by the control system 7. The light beam 10 is a light beam emitted or received by the optical path module 3, which is corresponding to the detection zone 9 in the microfluidic chip 1. Illumination source 8 is a white LED lamp that provides a source of light for system bright field imaging. The micro-droplet detecting sensor 11 is located above the detection zone 9.

Figure 2:
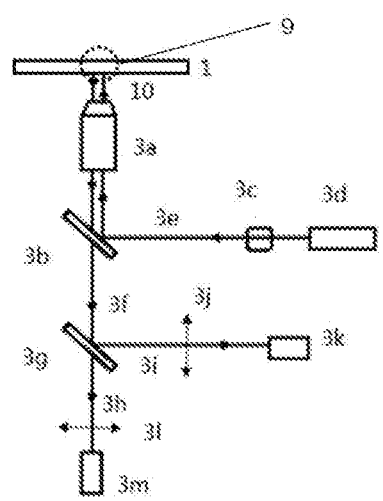
FIG. 2 is a schematic diagram of an optical path device of a micro-droplet fluorescence detection system according to an embodiment of the present invention.

In one embodiment, the principle diagram of the fluorescence excitation part, the fluorescence collecting part, and the bright field imaging part of the optical path module 3 are shown in FIG. 2.

Fluorescence excitation part: The laser 3d is used to excite the fluorescence in the micro-droplet, the output laser has a wavelength of 488 nm and the power is 50 mW, and the emitted laser beam 3e is broadly bundled by the beam bundler 3c to reach the dichroic mirror 3b. The dichroic mirror 3b has the characteristics of long-wave pass and short-wave reflection. The light with the wavelength being lower than 500 nm will be reflected, and the wavelength higher than 500 nm will be transmitted, and the dichroic mirror 3b has an angle of 45° with the laser beam 3e. Therefore, the laser beam 3e will be reflected into the objective lens 3a and focused into the detection zone 9, wherein the objective lens 3a is a microscope objective lens having a magnification of 20 times.

Fluorescence collecting part: If there is fluorescence in the detection zone 9, the fluorescence is collected by the objective lens 3a and is changed into parallel light to reach to the dichroic mirror 3b. Since the fluorescence wavelength is 520 nm, higher than 500 nm, the light beam 3f passes through the dichroic mirror 3b and then reaches the dichroic mirror 3g. The dichroic mirror 3g also has the characteristics of long-wave pass and short-wave reflection. Light having a wavelength lower than 540 nm will be reflected, and light higher than 540 nm will be transmitted, so that the fluorescent light beam 3i in the light beam 3f is reflected into the imaging lens 3j. Finally, it is focused into the photomultiplier 3k, and the photomultiplier 3k converts it into an electrical signal and feeds it back to the control system 7.

Bright field imaging part: If there is bright field illumination light in the detection zone 9, the illumination light is collected by the objective lens 3a and becomes parallel light to the dichroic mirror 3b. Since the illumination light generally is a broad spectrum of light, light having a wavelength of more than 500 nm in the illumination light passes through the dichroic mirror 3b to form the light beam 3f, and then reaches the dichroic mirror 3g. Since the dichroic mirror 3g also has a long-wavelength and short-wave reflection characteristic, light having a wavelength greater than 540 nm in the beam 3f will pass through the dichroic mirror 3g to form 10 an imaging beam 3h, and finally focused on the camera 3m through the imaging lens 3l. Thus, the camera 3m can acquire the image information in the detection zone 9 in real time, thereby completing the alignment of the detection zone 9 with the chip channel.

Figure 3:
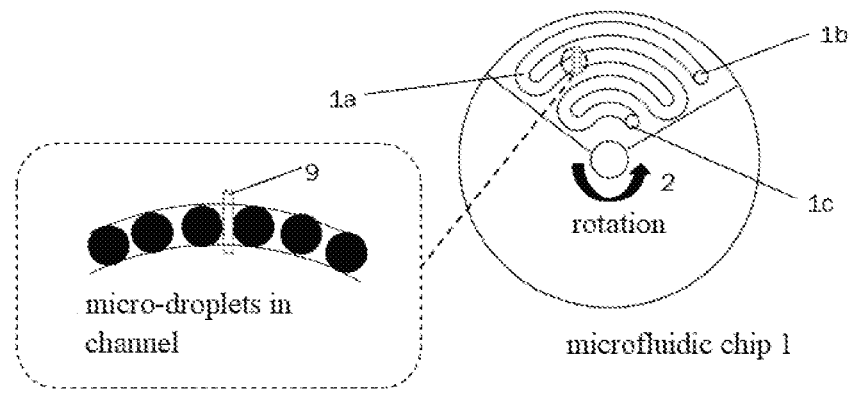
FIG. 3 is a schematic diagram showing the relationship between a channel structure and a detection zone of a microfluidic chip of a micro-droplet fluorescence detection system according to an embodiment of the invention.

In one embodiment, a schematic diagram of the channel structure and the detection zone 9 of the microfluidic chip 1 is shown in FIG. 3. The shape of the microfluidic chip 1 is circular, and the center of the chip coincides with the center of rotation of the rotary shaft 2. The microfluidic chip 1 has one channel 1a, and the channel is composed of a plurality of arc-shaped channels. The arc-shaped channels are characterized in that the centers of the arcs coincide and coincide with the center of the microfluidic chip 1, and the depth of the channel is 100 micrometers, and the width of the channel is 100 microns. The channel inlet 1b and the channel outlet 1c are respectively located at both ends of the channel, and when the micro-droplets are input into the channel, they are arranged next to each other in a queue, as shown in the top view of the detection zone 9. The detection zone 9 is only the position of the optical focus of the optical path module 3 on the microfluidic chip 1 and is not a specific chip structure. At this time, the center thereof is located at the center of the channel, and when the chip rotates, the micro-droplets inside of the arc channel will pass through the detection zone 9 in sequence, and the fluorescence information of each micro-droplet will be detected.

Figure 4:
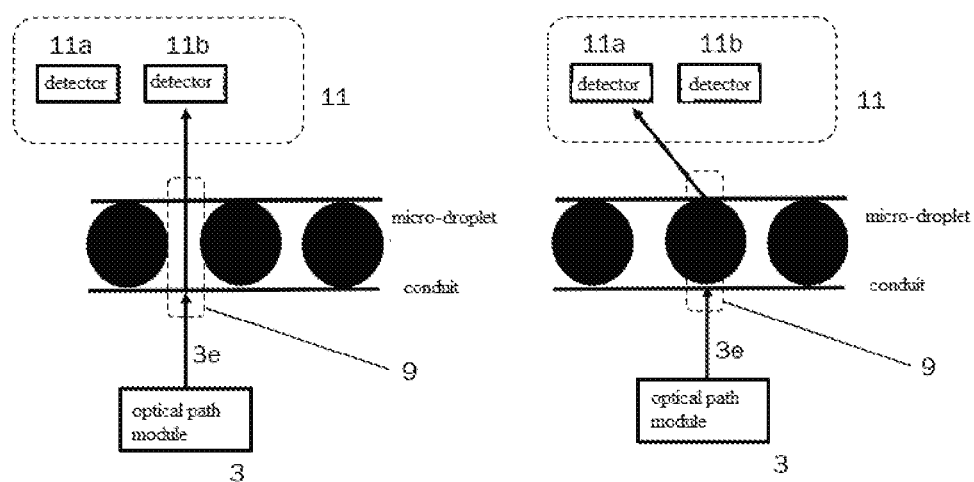
FIG. 4 is a schematic diagram showing the principle of determining the position of a micro-droplet by refraction of a laser in a micro-droplet fluorescence detecting system according to an embodiment of the present invention.

In one embodiment, FIG. 4 is a schematic diagram showing the principle of determining the position of a micro-droplet by the refraction of a laser beam through the micro-droplet position detecting part of the optical path module 3. The optical path module 3 emits a laser beam 3e toward the detection zone 9. If there is no micro-droplet in the detection zone 9, the laser beam 3e will be irradiated onto the photodetector 11b through the chip, and the detector 11b will output a high voltage signal to the control system 7 and the detector 11a outputs a low-voltage signal due to the fact that the detector 11a is not irradiated by the laser beam 3e. The control system 7 judges that the detection zone 9 has no micro-droplets by comparing the two voltage signals. When a micro-droplet exists in the detection zone 9, the laser beam 3e is refracted by the micro-droplet to be irradiated onto the detector 11a, and by comparing it with the signal of the detector 11b, it can be determined that a micro-droplet exists in the detection zone 9.

Figure 5:
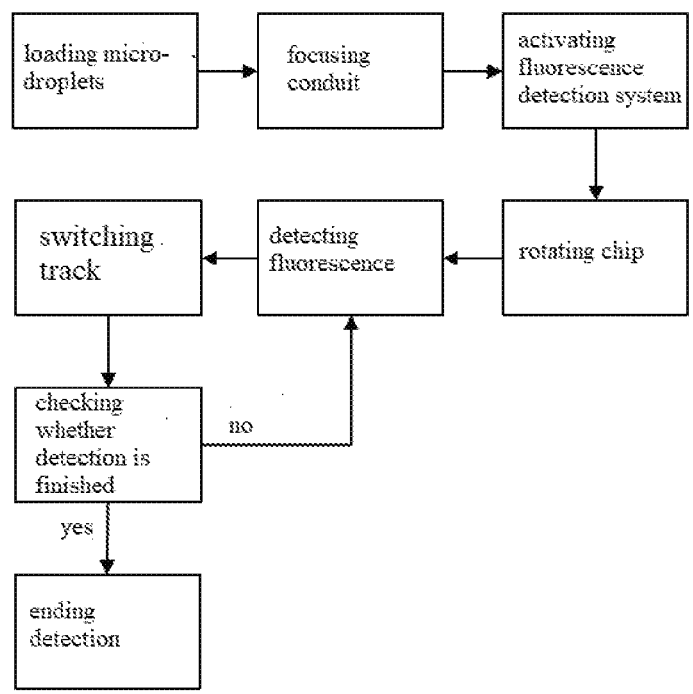
FIG. 5 is a flow chart showing the operation of the micro-droplet fluorescence detecting system of one embodiment of the present invention.

As shown in FIG. 5, the fluorescence detecting table in one embodiment of the present invention completes one-time micro-droplet fluorescence detection and it has eight steps.

Step 1, loading micro-droplets. The micro-droplet sample to be tested is injected from the channel inlet 1b to the channel 1a, and after the micro-droplet is filled with the channel 1a, the channel inlet 1b and the channel outlet 1c are sealed, so that the micro-droplet cannot flow freely in the channel 1a. The microfluidic chip 1 is then loaded onto the rotary shaft 2.

Step 2, focusing channel. Since the detection zone 9 is a very small specific area located above the optical path module 3, it is the focus of fluorescence excitation light convergence and fluorescence reception, and its position is fixed with respect to the optical path module 3. The channel focusing operation is such that the center of the detection zone 9 coincides with the center of the channel 1a. The operation is realized by changing the vertical height of the microfluidic chip 1 by controlling the electric lifting table 6, so that the channel 1a and the detecting area 9 are at the same height. Then, by controlling the electric rotating table 5 and the electric sliding table 4, the horizontal positions of the detection zone 9 and the channel 1a are coincident, and finally the centers coincide to complete the focusing. The whole process is completed under the observation of the bright field light source 8 and the camera 3m.

Step 3, activating fluorescence detection system. Before starting, the bright field light source 8 needs to be turned off, then the laser 3d and the photomultiplier 3k are turned on, and the liquid micro-droplet detecting sensor 11 is turned on at this time, and the fluorescence detecting system is in an operating state.

Step 4, rotating chip. The electric rotating table 5 is activated, and the microfluidic chip 1 starts to rotate around the center. Since the micro-droplets in the channel 1a are unable to flow, they will move along with the channel and pass through the detection zone 9 in sequence.

Step 5, detecting fluorescence. When the micro-droplets pass through the detection zone 9, they will be illuminated by the laser. If fluorescence is generated in the micro-droplets, the fluorescent signal will be detected and recorded, and the analysis will be performed in real time in the control system 7.

Step 6, switching track. The track refers to a circular arc channel having the same radius on the channel 1a. After one rotation of the chip, the micro-droplets in the track in which the detection zone 9 is located are detected, and the electric sliding table 4 starts to work, moving the detection zone 9 to another track, since the distance between the tracks is known, at this point, only the electric sliding table 4 needs to be moved a known distance to complete the switching of the track, and no additional observation means is required.

Step 7, checking whether detection is finished. If the micro-droplets on all the tracks have been detected at this time, the detection is completed. Otherwise, return to step 5 and continue to detect the micro-droplet fluorescence, so repeat until the micro-droplets on the track are detected.

Step 8, ending detection. When all the micro-droplets on the track have been detected, the system completes a drop fluorescence detection.

Example 2

Rapid Detection of Micro-Droplet Digital PCR Results

Step 1, a 20-microliter PCR system is required to generate micro-droplets from 20 microliters of PCR system and perform micro-droplet PCR amplification. 20 microliter PCR system contained 10 microliters of Bio-Rad ddPCR Supermix for Probes, 5 microliters of GJB2 gene upstream and downstream primer reagents and 5 microliters of template containing 1 ng of genomic DNA. 20 microliters of PCR system and 40 microliters of Bio-Rad Generation Oil were placed in a Bio-Rad QX200 micro-droplet generator to generate micro-droplets and transferred to a 200 microliter test tube by a pipette. Then, the test tube was placed in a PCR instrument. The PCR cycle program was: pre-denaturation at 95° C. for 10 min, 95° C. for 15 s, 55° C. for 20 s, and 72° C. for 30 s for a total of 40 cycles, and finally 4° C. for heat preservation. Wait for the reaction to end.

Step 2, injecting the micro-droplets after the PCR reaction into the microfluidic chip 1 and perform focusing of the optical path module 3. The liquid micro-droplets are fed into the channel 1a from the channel inlet 1b, and the channel inlet 1b and the channel outlet 1c are sealed after the micro-droplets are filled with the channel 1a. The microfluidic chip 1 containing micro-droplets is placed on the rotary shaft 2, the control system 7 is activated, the bright field light source 8 and the camera 3m are turned on, and the control system 7 displays the image of the detection zone 9 in real time, and the position of the detection zone is required at this time. Aligned on the channel 1a. By controlling the electric lifting table 6, the vertical distance between the duct 1a and the detection zone 9 is adjusted so that the detection zone 9 coincides with the duct 1a, and at this time, the control system 7 displays a clear image of the channel 1a. Then, the electric sliding table 4 is controlled to horizontally move the detection area 9 so that its center coincides with the center of the channel 1a to complete the focusing operation.

Figure 6:
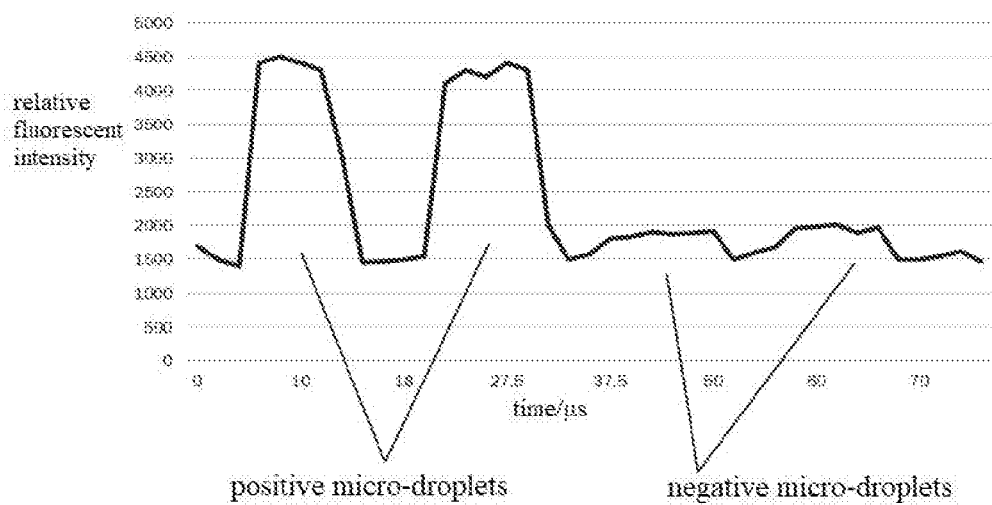
FIG. 6 is a graph showing the results of fluorescence signal detection of micro-droplet PCR using the micro-droplet fluorescence detecting system of the present invention.

Step 3, starting micro-droplet fluorescence detection. After the focus is completed, the bright field light source 8 and the camera 3m are turned off, the laser 3d and the photomultiplier 3k are turned on, and the electric rotating table 5 is activated to rotate the chip at a speed of 1000 r/min to start micro-droplet fluorescence detection. After the micro-droplets in the channel 1a pass the digital micro-droplet PCR, two types of micro-droplets are formed, one type is a positive micro-droplet containing a template and thus an amplification reaction occurring, and the other type is a negative micro-droplet containing no template and thus not amplifying. The positive micro-droplets have a strong fluorescence and the negative micro-droplets have no fluorescence. The control system 7 will judge whether there is a micro-droplet in the detection zone by the micro-droplet detecting sensor 11, and then judge whether a micro-droplet is negative or positive by reading the signal of the photomultiplier 3k, and count the micro-droplet, wherein the fluorescent signal diagram is shown in FIG. 6. The micro-droplet detection speed at this time reaches a speed of about 50,000 per second. Thus, after the chip rotates by one circle, the micro-droplet fluorescence on the channel of the same radius is detected, then the control system 7 automatically controls the electric sliding table 4, moving the detection zone 9 to the arc of another radius and completing micro-droplet fluorescence detection. The micro-droplet fluorescence detection of the entire chip can also be finished.

It should be understood that the invention disclosed is not limited to the particular methods, aspects, and materials described, as these may vary. It is also understood that the terminology used herein is for the purpose of describing the particular embodiments of the invention, and is not intended to limit the scope of the invention. Those skilled in the art will also recognize, or be able to ascertain, many equivalents of the specific embodiments of the invention described herein. These equivalents are also included in the appended claims.

The invention claimed is:

1. A micro-droplet fluorescence detecting system, comprising:
   a microfluidic chip comprising a channel for storing micro-droplets such that the micro-droplets are laid in a single layer in the channel;
   an optical path device comprising a fluorescent excitation part, a fluorescence collecting part, a bright field imaging part, and a micro-droplet position detecting part;
      wherein the fluorescent excitation part causes the micro-droplets containing a fluorescent substance to be fluorescent in an excitation zone; the fluorescence collecting part is used for separating the micro-droplet fluorescence signal from background light and the micro-droplet fluorescence signal is detected by a detecting device; the bright field imaging part utilizes an illumination source and an imaging optical path to acquire the image information of the chip channel in real time, thereby realizing the alignment of a detection zone and a chip channel; the micro-droplet position detecting part utilizes an oil phase and a water phase of the micro-droplets to be different in light refractive index for realizing determination of the micro-droplet position of the detection zone; and
   a movement control device, which is used for controlling the mechanical movement of the chip and the optical path device, so that in the process of the micro-droplet fluorescence scanning detection in the chip, the chip and the optical path device move relative to each other, while the micro-droplets in the chip and the chip are kept relatively static;
   wherein said movement control device comprises an electric rotating table, an electric lifting table and a control system, the electric rotating table is fixed on the electric lifting table, and the control system controls the movement of the electric rotating table and the electric lifting table.

2. The micro-droplet fluorescence detecting system according to claim 1, wherein said channel depth ranges from 5 µm to 1 mm and said channel width ranges from 5 µm to 10 cm.

3. The micro-droplet fluorescence detecting system according to claim 1, wherein said chip has a circular shape, the channel is formed by connecting a plurality of arcs, and the center of each arc coincides with the center of the chip; or the chip has a rectangular shape, and the channel is composed of one or more cavities.

4. The micro-droplet fluorescence detecting system according to claim 1, wherein the excitation light wavelength range used by the fluorescence excitation part ranges from 200 nm to 3000 nm.

5. The micro-droplet fluorescence detecting system according to claim 1, wherein said excitation zone comprises a plurality of micro-droplets, and the excitation light simultaneously excites a plurality of micro-droplets in the excitation zone; or the excitation zone contains at most one micro-droplet, the excitation light simultaneously excites at most one micro-droplet in the excitation zone.

6. The micro-droplet fluorescence detecting system according to claim 1, wherein said fluorescent excitation part is integral with or separate from said fluorescence collecting part.

7. The micro-droplet fluorescence detecting system according to claim 1, wherein in the micro-droplet fluorescence detection process, said movement control device enables the chip to rotate along a rotation center, and said optical path device moves radially along the rotation center of the chip to complete the fluorescence detection process; or in the micro-droplet fluorescence detection process, said movement control device causes the optical path device to be stationary, and the chip is used for completing the fluorescence detection process in a line-by-line scanning movement mode; or in the micro-droplet fluorescence detection process, said movement control device is used for enabling the chip to be static, while the optical path device completes the fluorescence detection process by taking the center of the chip as a starting point according to a spiral movement track.

8. The micro-droplet fluorescence detecting system according to claim 1, wherein the microfluidic chip is fixed on the electric rotating table through a rotary shaft, and the center of the microfluidic chip coincides with the rotating center of the rotary shaft.

9. The micro-droplet fluorescence detecting system according to claim 8, wherein said movement control device further includes an electric sliding table, said optical path device is fixed on the electric sliding table, the electric sliding table is controlled by the control system and can horizontally move in the direction toward to or away from the rotating center.

10. The micro-droplet fluorescence detecting system according to claim 8, the light beam emitted or received by the optical path device corresponds to the microfluidic chip detection zone; the optical path device includes a micro-droplet detecting sensor located above the detection zone.

* * * * *